June 23, 1964  A. C. DAMES ETAL  3,138,222
FLUID FEED ASSEMBLY FOR DIFFERENTIAL MECHANISMS
Filed May 31, 1961  2 Sheets-Sheet 1

INVENTORS
ALBERT C. DAMES
JOSEPH J. WEYN
BY CURT SAURER

OLSEN AND STEPHENSON
ATTORNEYS

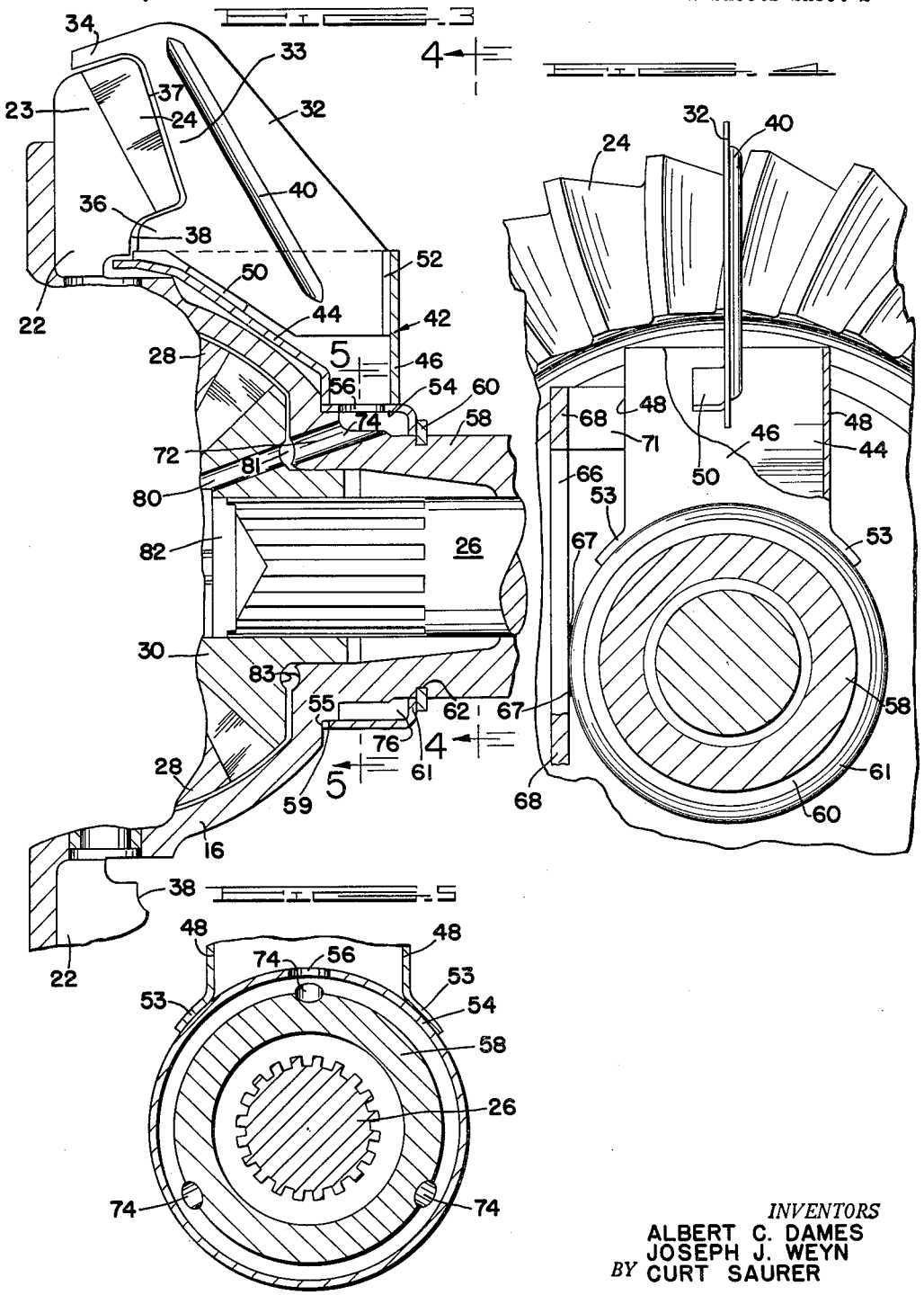

3,138,222
FLUID FEED ASSEMBLY FOR DIFFERENTIAL MECHANISMS
Albert C. Dames, Detroit, Joseph J. Weyn, Dearborn, and Curt Saurer, Oak Park, Mich., assignors to Thornton Products Co., Dearborn, Mich., a corporation of Michigan
Filed May 31, 1961, Ser. No. 113,870
4 Claims. (Cl. 184—11)

This invention relates generally to automotive vehicle differential mechanisms and more particularly to an improved apparatus for delivering fluid to the working parts in differential mechanisms.

In the usual vehicle differential mechanism, torque from the drive shaft is applied to a ring gear disposed in the differential housing. The ring gear is secured to a gear case which is rotatable in the housing and which carries the pinion gears that drive the side gears secured to the rear axles. Lubrication of the gears within the gear case is accomplished merely by the splashing of lubricant in the housing. This is a somewhat ineffective and reliable method of lubricating the gears in the gear case and accordingly some difficulties have been encountered due to improper lubrication of these gears. Also, some differentials of the locking type, such as the differential disclosed in copending application Serial No. 54,642, filed September 8, 1960 now Patent No. 3,109,323 and owned by the assignee of this invention, require a supply of operating fluid for their actuation and this fluid must be supplied to the interior of the gear case.

It is an object of this invention, therefore, to provide an improved apparatus for feeding fluid from the differential housing to the interior of the gear case.

A further object of this invention is to provide a gravity feed unit which is readily assembled with a differential mechanism and which is operable to convey fluid from the differential housing to the interior of the gear case for lubrication or other purposes.

A further object of this invention is to provide a differential mechanism with a gravity feed unit which is operable to remove lubricating fluid from a rotating member in a differential housing and direct it to the interior of the gear case.

Another object of this invention is to provide apparatus in the differential housing which operates to remove the lubricating fluid which clings to the ring gear and direct this fluid to the interior of the gear case.

A further object of this invention is to provide lubricant feeding apparatus which provides for substantially complete filling of the differential gear case under operating conditions to thereby reduce and substantially eliminate gear noise.

A further object of this invention is to provide for a feeding of lubricants to the differential gear case without the addition of air bubbles to the lubricant.

A further object of this invention is to provide apparatus for feeding lubricant to the interior of the gear case counteracting the centrifugal force of the rotating gear case lubricant at high speeds.

Still another object of this invention is to provide a gravity feed unit for vehicle differential mechanisms which is economical to manufacture and install on conventional and other differential mechanisms and which is efficient in operation in providing for a delivery of fluid to the interior of the gear case.

Further objects, features and advantages of this invention will become apparent from a consideration of the following description, the appended claims, and the accompanying drawing in which:

Figure 1:
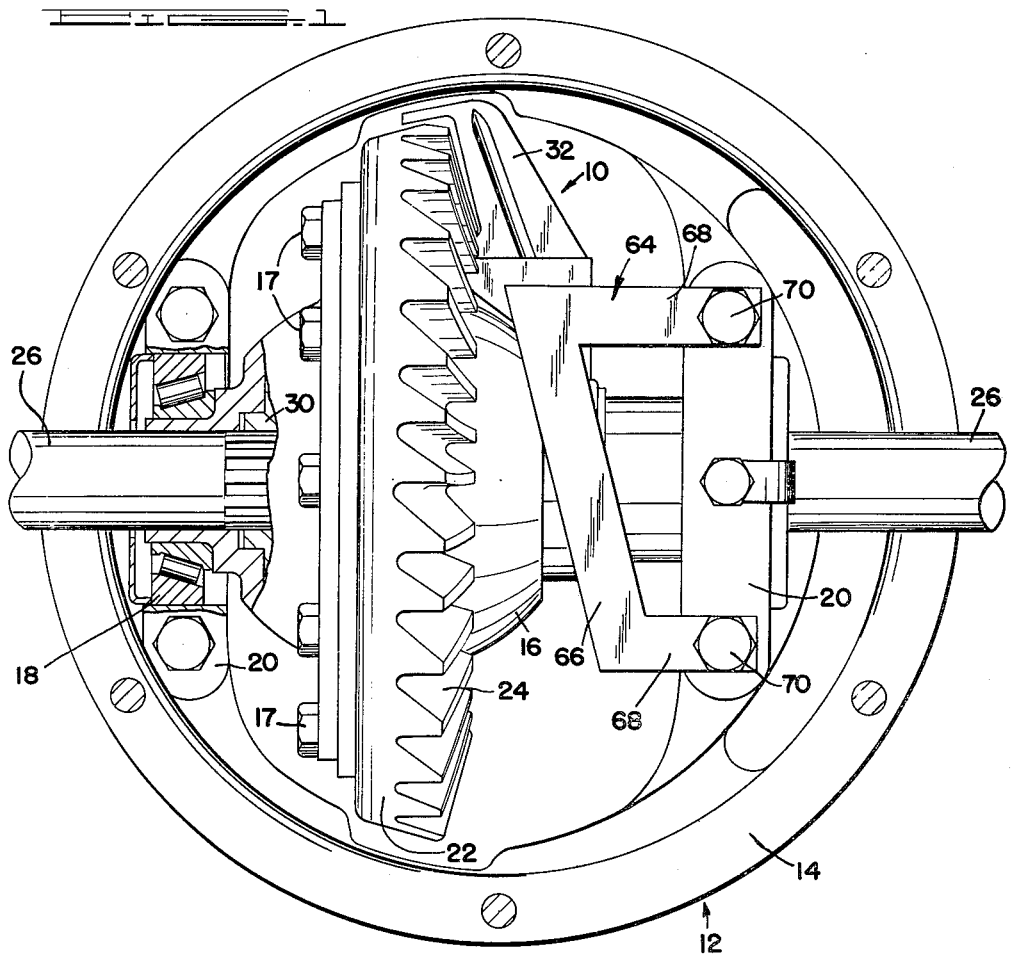
FIGURE 1 is an elevational view of a vehicle differential mechanism showing the fluid feed unit of this invention in assembly relation therewith, with a portion of the differential housing removed and with some portions of the mechanism broken away and other portions shown in section for the purpose of clarity.
Figure 2:
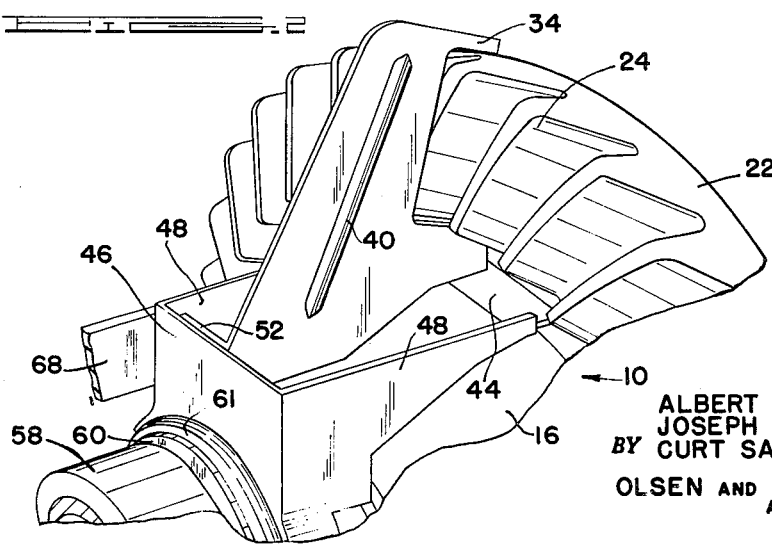
FIGURE 2 is a fragmentary perspective view of a portion of the assembly shown in FIG. 1.

FIGURE 3 is a fragmentary vertical sectional view of a portion of the assembly shown in FIG. 1; and FIGURES 4 and 5 are transverse sectional views looking substantially along the lines 4—4 and 5—5 in FIG. 3.

With reference to the drawing, the gravity feed unit of this invention, indicated generally at 10, is illustrated in FIG. 1 in assembly relation with a vehicle differential mechanism 12 which may be either of the conventional type or the self-locking type disclosed in the above referred to copending application. The mechanism 12 includes a housing 14 in which a gear case 16 is rotatably mounted on a pair of bearings 18 (only one of which is shown) supported on opposite sides of the housing 14 and retained in substantially axially aligned positions by bearing end caps 20. A ring gear 22, having a laterally extending annular toothed portion 23 formed with teeth 24, is secured to the gear case 16 by a plurality of bolts 17 so that it extends about the gear case 16 and is positioned in a driven relation with the vehicle drive shaft (not shown). A pair of axles 26 extend into the gear case 16 from transversely opposite sides thereof and are driven by any suitable gear assembly disposed within the gear case 16. In the illustrated embodiment of the invention, the gear case carries a pair of pinion gears 28, only fragmentary portions of which are shown, which rotate with the gear case 16 and mesh with a pair of side gears 30 that are spline connected to the inner ends of the axles 26. The gear case 16, ring gear 22, and axles 26 thus rotate about a substantially horizontal axis during travel of the vehicle equipped with the differential 12 on a flat road surface.

The housing 14 is partially filled with a suitable lubricating fluid which during travel of the vehicle equipped with the differential mechanism 12 is splashed around the interior of the housing 14 and adheres to and travels with the movable parts in the housing 14. Substantial quantities of this lubricating fluid travel with the rotating ring gear 22 and particularly the toothed portion 23 thereof.

The feed unit 10 functions to deliver some of this lubricant in the housing 14 to the interior of the gear case 16. The unit 10 includes a lubricant interceptor plate 32, of irregular shape, having a substantially U-shaped portion 33 which straddles the toothed portion 23 of the ring gear 22 at a point on the periphery of the ring gear 22 substantially horizontally aligned with the plate 32. The U-shaped portion 33 has vertically spaced upper and lower legs 34 and 36 which extend laterally toward the gear 22 on opposite sides of the toothed portion 23. The leg 34 is positioned above a tooth 24, during its travel past the plate 32 and the leg 36 is positioned below such tooth 24 and projects into an annular groove 38 formed in the toothed side of the ring gear 22 at a position radially inwardly of the teeth 24. It has been gound that substantial quantities of lubricant adhere to the portions of the ring gear 22 on radially opposite sides of the toothed portion 23 as well as to the laterally outer edges 37 of the teeth 24, and the rotation of the gear 22 causes a radially outward movement of some of this fluid on the teeth 24 toward the leg 34. The radially and laterally outwardly inclined shape of the teeth 24 provides for some movement of the fluid thereon laterally outwardly toward the plate 32 during travel past the plate 32.

When this lubricant adhering to and traveling with the ring gear 22 is engaged by the interceptor plate portion 33, it is transferred to the plate 32 and the inertia of some of the fluid causes some flow on the plate 32 in a direction laterally away from the ring 22. The fluid on the plate 32 then travels, under the force of gravity, downwardly on the plate 32 which is provided with an inclined reinforcing rib 40 primarily for strength purposes. A funnel or lubricant collector member 42 is disposed below the interceptor plate 32 and supports the interceptor plate 32. The funnel member 42 has a downwardly inclined bottom or front wall 44, which is disposed between the interceptor plate 32 and the gear case 16 and a vertical rear wall 46 which is horizontally spaced from the front wall 44. A pair of substantially parallel side walls 48 connect the front and rear walls 44 and 46. The interceptor plate is supported on the funnel member 42 by means of a pair of mounting tabs 50 and 52 which are integral with the plate 32 and are secured to the front and rear walls 44 and 46, respectively, so as to mount the interceptor plate 32 in an upright position in the upper portion of the housing 14.

The side walls 48 of the funnel member 42 are provided at their lower ends with short arcuate legs 53 which are secured to a ring member 54 which functions both as a bottom wall for the funnel member 42 and as a mounting or stabilizing member for the funnel member 42. The ring member 54 is formed, substantially midway between the sidewalls 48, with a central opening 56 which constitutes a discharge opening for the funnel member 42. The ring member 54 extends about an annular hub portion 58 of the gear case 16 and has one end 55 positioned in close proximity to an annular shoulder 59 on the gear case 16. A retainer ring 60 is secured to a radial flange 61 on the opposite end of the ring member 54 and positioned in a groove 62 in the hub portion 58 for mounting the ring member 54 in a desired fixed position relative to the gear case 16. A mounting frame 64, of generally U-shape (FIG. 1) is connected to the funnel member 42 and the ring member 54 mounted on the housing 14 for maintaining the unit 10 in a desired position in the housing 14. The frame 64 includes an upright portion 66 which is positioned in a substantially vertical plane and is secured such as by welding 67 to one side of the ring member 54 and a pair of vertically spaced leg portions 68 which are connected to one of the bearing end caps 20 by means of the mounting bolts 70 utilized for securing that end cap 20 to the housing 14. The upper leg portion 68 is secured to one end of a spacer block 71, the opposite end of which is secured to one of the funnel member side walls 48.

In the illustrated embodiment of the invention, the gear case 16 is formed with three radially and axially inwardly inclined oil delivery openings 72 (FIGS. 3 and 5) which have their outer inlet ends 74 substantially vertically aligned with the discharge opening 56 in the funnel member 42. The inlet ends 74 of the openings 72 are also located generally between the gear case shoulder 59 and the ring flange 61 so that the openings 72 are in continuous communication with a chamber 76 formed between the gear case hub 58 and the ring member 54. As a result, lubricant flowing downwardly from the funnel discharge opening 56 either flows directly into the inlet ends 74 of the openings 72 or flows into the annular chamber 76 and thence into the inlet ends 74 of the openings 72. This fluid is discharged into the interior of the gear case 16 and the movement of the gears 28 and 30 in the gear case 16 provides for the desired distribution of the fluid onto the gears 28 and 30. In the illustrated embodiment of the invention one of the side gears 30 is also provided with openings 80 which communicate with an annular chamber 81, formed between aligned annular grooves 83 provided on the gear case 16, at the outlet ends of the openings 72, and the adjacent gear 30. The openings or passages 80 function to deliver some of the lubricant supplied to the interior of the gear case 16 to a chamber 82 at the inner end of one of the axles 26. This fluid in the chamber 82 may be utilized by the hydraulic axle locking mechanism (not shown) such as that illustrated in the copending application referred to above.

In the operation of the gravity feed unit 10, during rotation of the ring gear 22, the fluid adhering to the side of the ring gear provided with the teeth 24 engages the upright interceptor plate 32 and is thus transferred to the interceptor plate 32. This fluid flows downwardly on the interceptor plate 32 into the funnel member 42 where it is collected and discharged through the bottom outlet opening 56 for flow through the gear case openings 72 into the interior of the gear case 16. As a result, a continual supply of lubricating fluid to the interior of the gear case 16 is insured without the requirement of any costly pump mechanism. It is to be understood that while the interceptor member 32 has been illustrated in a position at the upper end of the housing 14 at a position closely adjacent the ring gear teeth 24, it is within the purview of this invention to mount the plate 32 adjacent any of the other rotating parts which are normally splashed with lubricant in the housing 14, such as the gear case 16 or the bolts 17, and to mount the interceptor plate 32 at a lower position in the housing 14, it being only necessary that the interceptor plate 32 be mounted above the inlet ends of the passages 72 which supply fluid to the interior of the gear case 16. The interceptor plate 32 may also, if desired, be placed at an angle or curved so as to deflect the fluid downwardly and utilize the momentum of the fluid to obtain a slight fluid pressure in the funnel member 42 to assist in overcoming the centrifugal force on the fluid in the gear case 16.

It will be understood that the fluid feed assembly for differential mechanisms which is herein disclosed and described is presented for purposes of explanation and illustration and is not intended to indicate limits of the invention, the scope of which is defined by the following claims.

What is claimed is:

1. In a vehicle differential which includes a housing adapted to contain a lubricating fluid, means including an upright ring gear rotatably mounted in said housing for rotation about a substantially horizontal axis, said ring gear having a laterally extending toothed portion; gravity feeding means for delivering some of said fluid to a desired location in the housing comprising a fluid interceptor member of plate form positioned in an upper portion of said housing and having a portion which extends laterally toward said ring gear into a closely spaced relation with the radially inner side of said toothed portion and into a position underneath said toothed portion whereby fluid adhering to said ring gear toothed portion engages said interceptor portion and is transferred thereto, a downwardly extending funnel member having a downwardly inclined bottom wall positioned immediately below and in a supporting relation to said interceptor member including said portion which extends laterally toward said ring gear for receiving fluid traveling downwardly therefrom, and a mounting frame secured to said housing and arranged in a supporting relation with said funnel member, said funnel member having a lower discharge portion disposed adjacent said desired location.

2. In a vehicle differential which includes a housing adapted to contain a lubricating fluid, a gear case rotatably mounted in said housing for rotation about a substantially horizontal axis, said gear case having a hub portion on one side thereof concentric with said axis, and an upright ring gear secured to said case for rotation therewith, said ring gear having a laterally extending toothed portion; gravity feeding means for delivering some of said fluid to the interior of said gear case comprising a fluid interceptor member positioned in an upper portion of said housing and having a substantially U-shape portion which extends laterally toward said ring gear in a straddling relation with said toothed portion whereby fluid adhering to said ring gear toothed portion engages said U-shape portion and is transferred thereto, a funnel assembly positioned below and in a supporting relation with said interceptor member so that the interceptor member extends into said funnel assembly and fluid traveling downwardly on the interceptor member flows into said funnel assembly, means mounting said funnel assembly in a fixed position on said housing, a ring member secured to said funnel assembly in a position extending about and engaged with said gear case hub portion so as to form therewith an annular chamber, passage means in said case communicating the interior thereof with said annular chamber, and means communicating a lower portion of said funnel assembly with the interior of said annular chamber.

3. In a vehicle differential which includes a housing, a gear case rotatably mounted in said housing and provided on transversely opposite sides with a pair of shaft receiving openings, a pair of substantially horizontal axle shafts journaled on transversely opposite sides of said housing and projected into said gear case through said openings, a lubricant in said housing, a ring gear rotatable with said gear case in contact with said lubricant, said ring gear having teeth thereon which project in a substantially horizontal direction from one side thereof, an upright lubricant interceptor member poistioned in an upper portion of said housing in close proximity to said one side of said ring gear, said interceptor member having a substantially U-shape portion disposed adjacent and in a straddling relation with said teeth and disposed in a closely spaced relation with the radially inner sides of said teeth and said one side of said ring gear, so that lubricant adhering to said teeth and said one side of said ring gear engages said interceptor member and is transferred thereto on travel of said ring gear past said interceptor member, means forming a downwardly extending passage in said housing having its upper end positioned below said interceptor member for receiving lubricant flowing downwardly therefrom, said passage having a lower outlet end positioned adjacent one of said gear case shaft receiving openings, means forming an annular chamber in said housing in fluid communicaiton with said outlet end of said passage, and said gear case having an opening therethrough adjacent said one shaft receiving opening and communicating with said annular chamber outlet for receiving lubricant therefrom.

4. In a vehicle differential which includes a housing, a gear case rotatably mounted in said housing and provided on transversely opposite sides with a pair of shaft receiving openings, a pair of substantially horizontal axle shafts journaled on transversely opposite sides of said housing and projected into said gear case through said openings, a lubricant in said housing, an upright ring gear rotatable with said gear case in contact with said lubricant, said ring gear having a laterally extending toothed portion, an upright lubricant interceptor member positioned in an upper portion of said housing and having a substantially U-shape portion which extends laterally toward said ring gear in a straddling relation with said toothed portion whereby lubricant adhering to said ring gear toothed portion engages said U-shape portion and is transferred thereto, a funnel assembly secured in a fixed position to said housing, said assembly having a downwardly extending bottom wall having its upper end portion positioned below said interceptor member for receiving lubricant flowing downwardly therefrom, said funnel assembly having a lower outlet end positioned adjacent one of said gear case shaft receiving openings, means on said funnel assembly forming with said gear case an annular chamber extending about said one shaft receiving opening and arranged in fluid communication with said outlet end of the funnel assembly, and said gear case having an opening therethrough adjacent said one shaft receiving opening communicating with said annular chamber for receiving lubricant therefrom.

References Cited in the file of this patent

UNITED STATES PATENTS

| | | |
|---|---|---|
| 2,053,929 | Wiedmaier | Sept. 8, 1936 |
| 2,147,145 | Carlson et al. | Feb. 14, 1939 |
| 2,536,385 | Miller | Jan. 2, 1951 |
| 2,633,208 | Randt | Mar. 31, 1953 |

FOREIGN PATENTS

| | | |
|---|---|---|
| 590,867 | Great Britain | July 30, 1947 |

UNITED STATES PATENT OFFICE
CERTIFICATE OF CORRECTION

Patent No. 3,138,222　　　　　　　　　　　　June 23, 1964

Albert C. Dames et al.

It is hereby certified that error appears in the above numbered patent requiring correction and that the said Letters Patent should read as corrected below.

Column 2, line 59, for "gound" read -- found --; column 4, line 56, for "to" read -- with --; column 5, line 8, for "on" read -- in --.

Signed and sealed this 17th day of November 1964.

(SEAL)
Attest:

ERNEST W. SWIDER
Attesting Officer

EDWARD J. BRENNER
Commissioner of Patents